Figure 1:
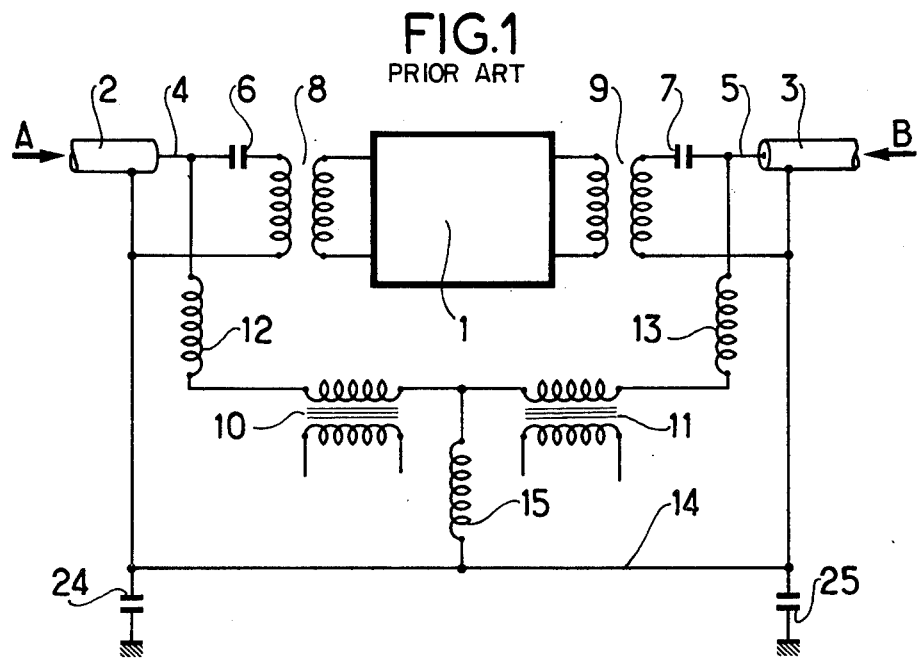

United States Patent [19]

Migeon

[11] 4,099,036
[45] Jul. 4, 1978

[54] REMOTE POWER SUPPLY SYSTEM FOR A COAXIAL LINE WITH REPEATERS SUBJECTED TO THE INFLUENCE OF EXTERNAL ELECTRIC FIELDS

[75] Inventor: René Migeon, Paris, France

[73] Assignee: Compagnie Industrielle des Telecommunications Cit-Alcatel S.A., Paris, France

[21] Appl. No.: 775,969

[22] Filed: Mar. 4, 1977

[30] Foreign Application Priority Data

Mar. 30, 1976 [FR] France ............................. 76 09192

[51] Int. Cl.² ............................................. H04B 3/44
[52] U.S. Cl. .............................................. 179/170 J
[58] Field of Search .................... 178/70 R, 70 TS; 179/170 R, 170 J, 170 T

[56] References Cited

U.S. PATENT DOCUMENTS

| 2,379,211 | 6/1945 | Bennett | 179/170 J |
| 2,594,019 | 4/1952 | Holman | 179/170 J |
| 2,784,264 | 3/1957 | Hansen et al. | 179/170 R |
| 3,249,703 | 5/1966 | Rickert | 179/170 J |

Primary Examiner—Kathleen H. Claffy
Assistant Examiner—Randall P. Myers
Attorney, Agent, or Firm—Sughrue, Rothwell, Mion, Zinn and Macpeak

[57] ABSTRACT

A remote power supply system is disclosed which is particularly for monocoaxial transmission lines equipped with repeaters. It comprises at least one current transformer inserted between two sections of line in a local power supply circuit at each repeater. The transformer has two identical primary windings one inserted in a first branch connection connecting the inner conductor of a line section to the outer conductor of the other line section, the other inserted in a second branch circuit connecting the other conductors of the line sections.

2 Claims, 2 Drawing Figures

REMOTE POWER SUPPLY SYSTEM FOR A COAXIAL LINE WITH REPEATERS SUBJECTED TO THE INFLUENCE OF EXTERNAL ELECTRIC FIELDS

The present invention relates to the remote AC power supply of repeaters in a monocoaxial transmission line equipped with repeaters.

In a monocoaxial line with repeaters requiring remote AC power supply, the transmission signals and the remote supply current propagate along the same conductors, but in different frequency bands: a frequency of 50 Hz for the remote supply current and frequencies higher than approximately ten kilohertz for the signal current. These currents are separated at the repeaters by band filters.

The remote supply current flows in a monocoaxial line along two opposite paths, the outgoing path and the return path forming a loop. Between each repeater, one of the paths is constituted by the inner conductor of the line and the other is constituted by the outer conductor. In general, there is no break in the metallic circuit of the outer conductor of the line at each repeater, while the internal conductor is cut, its ends being connected to separate connections, one transmitting the signals at the input-output element of the repeater in question and the other for conveying the remote supply current through the primary winding of a current transformer that forms part of the local power supply circuit of the repeater.

The penetration of an external electromagnetic field into a monocoaxial line decreases as the frequency increases. Hence, the influence of electromagnetic fields of industrial origin results essentially in low-frequency currents in the inner conductor of a coaxial line which do not interfere with the transmission of the signals but which do perturb the AC power supply current, being added to or subtracted from this current. The mode of connecting the primary windings of the transformers of the local power supply circuits of the repeaters as has been described in the preceding paragraph is sensitive to these perturbations.

Preferred embodiments of the present invention reduce the influence of currents induced by external electromagnetic fields on the remote power supply of the repeaters of a coaxial transmission line.

The present invention provides a remote AC power supply system for repeaters of a coaxial transmission line in which the remote supply current flows through the line along an outward path and a return path which form a remote supply loop and are constituted between the repeaters by the inner conductors and the outer conductors of the intervening section of the coaxial line and in which the local power supply circuit of each repeater is inserted between first and second sections of the coaxial line connected to the repeater, the local power supply circuit including at least one current transformer having a first primary winding and a second primary winding respectively inserted in the outgoing path and in the return path of the power supply loop so as to take the power necessary for supplying the repeater in equal proportions from each of the said paths and to ensure the continuity of the remote power supply loop at the repeater.

Other characteristics and advantages of the invention will become apparent from the accompanying claims and from the description hereinbelow of one embodiment given by way of example.

This description will be given with reference to the drawing in which

Figure 2:
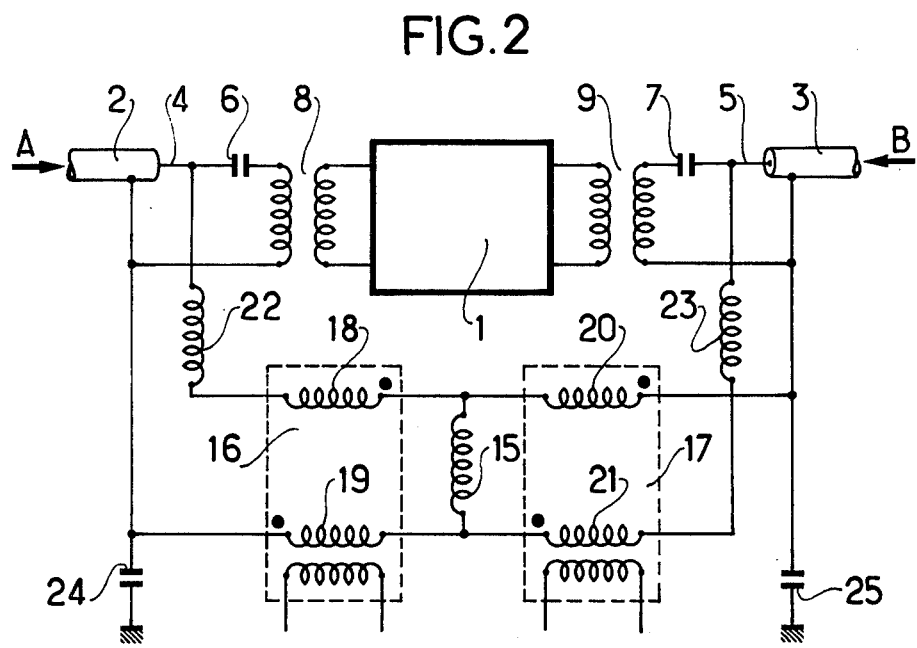

FIG. 1 is a wiring diagram of a repeater in a conventional (prior art) remote power supply system and FIG. 2 is a wiring diagram of a repeater of a remote power supply system embodying the invention.

FIG. 1 is a conventional (prior art) remote power supply system. A repeater 1 is inserted between two sections A and B of a monocoaxial transmission line whose respective outer conductors have been referenced by the numerals 2 and 3 and whose respective inner conductors have been referenced by the numerals 4 and 5. The ends of the inner conductors 4 and 5 of the sections A and B of the monocoaxial line are connected to the input-output elements of the repeater 1 via high-pass filters constituted by series connected capacitances 6, 7 followed by isolation transformers 8, 9. The high-pass filters allow the transmission of the signals in the direction of the input-output elements of the repeater 1 because of their high frequencies and block the remote power supply current because of its low frequency. The inner conductors 4 and 5 of the section A and B of the monocoaxial line are also connected by a shunt connection formed by the series connection of two current transformers 10, 11 belonging to the local power supply circuit of the repeater 1 and of two inductances 12, 13 forming low-pass filters which block the transmission of the signals and allow the remote power supply current to pass. The outer conductors 2 and 3 of sections A and B of the coaxial line are electrically connected by a connection 14. The low-value capacitors 24 and 25 are used for fixing the potential of the equipments in relation to earth potential at the frequencies of the transmission signals.

FIG. 1 has two current transformers 10, 11 in order to represent the fairly common case where it is necessary to have two supply sources available, but it is quite evident that there need be only one current transformer.

In the circuit shown in FIG. 1, an inductance 15 is connected between the interconnection point of the primary winding of the current transformers 10 an 11 and the connection 14 interconnecting the outer conductors 2 and 3 of sections A and B of the monocoaxial line. It is intended to compensate the capacities of the monocoaxial line and of the repeater 1 at the frequency of the remote power supply current to improve the power factor of the remote supply loop.

External electromagnetic fields generated e.g. by a power transport grid line or by the overhead wires of an electrified railway line in the vicinity of the monocoaxial transmission line induce different longitudinal currents in the inner and outer conductors which are essentially at low frequency. These induced longitudinal currents do not reach the input-output elements of the repeater 1 because they are stopped by the series-connected capacitances 6, 7. However, they do pass through the shunt connection formed by the series connection of the primary windings of the current transformers 10, 11 and of the inductances 12 and 13 and thereby provoke overvoltages and undervoltages in the local power supply circuit of the repeater 1 which are detrimental to the proper operation of the repeater.

The remote supply circuit shown in FIG. 2 embodies the invention and enables this defect to be reduced to a great extent. The elements of the circuit of FIG. 2 are unchanged with respect to those in FIG. 1 and the same reference numerals are used therein. This figure also shows the repeater 1 inserted between two sections A and B of a monocoaxial transmission line whose inner conductors are referenced 4, 5 and whose outer conductors are referenced 2, 3. As in FIG. 1, the inner conductors 4, 5 of the sections A and B of the monocoaxial line are connected to the input-output elements of the repeater 1 via high-pass filters which are constituted by the series-connected capacitances 6, 7 followed by isolation transformers 8, 9 and allowing the transmission of the signals but stopping the remote power supply current.

The local supply circuit of the repeater 1 comprises two current transformers 16, 17, since, as in the circuit of FIG. 1, it is presumed that the repeater 1 includes two supply sources. Each of these current transformers 16, 17 has two identical primary windings respectively 18 and 19, and 20 and 21.

The primary winding 18 of the current transformer 16, the primary winding 20 of the current transformer 17 and an inductance 22 are series connected in a first shunt connection connecting the inner conductor 4 of section A of the monocoaxial line to the outer conductor 3 of section B of the monocoaxial line. The primary winding 19 of the current transformer 16, the primary winding 21 of the current transformer 17 and an inductance 23 are series connected in a second shunt connection connecting the outer conductor 2 of section A of the monocoaxial line to the inner conductor 5 of section B of the monocoaxial line.

The inductance 15 fulfills the same function as in FIG. 1; it is matched with the capacitances of the monocoaxial line and of the repeater 1 at the frequency of the remote power supply current to improve the power factor of the remote power supply loop. In the case where the local power supply circuit of the repeater 1 comprises only one current transformer, it is sufficient to replace the primary winding 18, 19 or 20, 21 of the eliminated transformer by shorts.

The inductances 22 and 23 form low-pass filters which prevent the transmission of the signals through the first and second shunt connections but allow the remote power supply current to pass. At the repeater, these shunt connections respectively constitute an outgoing path and a return path of the remote supply loop. As they are connected on one side of the repeater to the inner conductor of the monocoaxial line and on the other side of the repeater to the outer conductor of this line, on either side of the repeater 1 they provide permutation between one section and another of the outgoing path and return path roles in the remote power supply loop of the inner conductor and outer conductor of the monocoaxial line.

The primary windings 18 and 19 or 20 and 21 of the respective current transformers 16 and 17 are wound and connected in directions such that the flux generated by the remote power supply currents which flow through them in opposite directions add together. In this way, the power necessary for supplying the repeater 1 and available to the secondary winding of the current transformers 16 and 17 is taken in equal parts from the outgoing and return paths of the remote supply loop. Further, the longitudinal currents which are induced in the outer and inner conductors of the monocoaxial line by external electromagnetic fields and which flow through these conductors in a same direction generate induction flows in the current transformers 16 and 17 in opposite directions which substract.

The longitudinal currents induced in the outer and inner conductors of the monocoaxial line by outer external electromagnetic fields do not have the same intensities because of the shielding effect of the outer conductor on the inner conductor. The results of this is that compensation cannot be made on a single section of the monocoaxial line. It is made on the two half-sections of line on either side of the repeater 1 due to the permutation from one section to the other at the repeater 1 between the outgoing path and return path functions fulfilled by the inner and outer conductors of the monocoaxial line.

Without going beyond the scope of the invention, some dispositions can be modified or some means can be replaced by equivalent means. In particular one of the transformers used in the local supply circuit of a repeater can be eliminated. Further, it is possible to insert an isolation transformer between the transformers 16 and 17 to break the metallic continuity and consequently to limit the length of a section subjected to the perturbing fields.

What we claim is:

1. A remote AC power supply system for repeaters of a coaxial transmission line in which the remote supply current flows through the line along an outward path and a return path which form a remote supply loop and are positioned between the repeaters by the inner conductors and the outer conductors of the intervening sections of the coaxial line, the local power supply circuit of each repeater being inserted between first and second sections of the coaxial line connected to the repeater and in parallel with said repeater, the local power supply circuit including at least one current transformer having a first primary winding and a second primary winding respectively inserted in the outward path and in the return path of the power supply loop so as to take the power necessary for supplying the repeater in equal proportions from each of the said paths and to ensure the continuity of the remote power supply loop at the repeater, said first primary winding being connected in a first series connection with a low-pass filter between the inner conductor of the first section of the coaxial line and the outer conductor of the second section of the coaxial line and said second primary winding being connected in a second series connection with a low-pass filter between the outer conductor of the first section of the coaxial line and the inner conductor of the second section of the coaxial line.

2. A remote power supply system according to claim 1, wherein the local power supply circuit includes a plurality of current transformers each having a first primary winding connected in a first series connection and a second primary winding connected in a second series connection.

* * * * *